(12) United States Patent
Belov et al.

(10) Patent No.: US 7,067,740 B1
(45) Date of Patent: Jun. 27, 2006

(54) CONVERSION KIT FOR A REMOTE MONITORING SYSTEM TRANSMITTER

(75) Inventors: Alex Belov, West Paterson, NJ (US); James J. Conway, Oakdale, NY (US); Chris Cyprus, Wading River, NY (US); Eric H. Dietmann, Bayside, NY (US); Richard T. Kampf, Setauket, NY (US)

(73) Assignee: BAE Systems Information and Electronic Systems Integration Inc., Wayne, NJ (US)

( * ) Notice: Subject to any disclaimer, the term of this patent is extended or adjusted under 35 U.S.C. 154(b) by 0 days.

(21) Appl. No.: 11/089,118

(22) Filed: Mar. 24, 2005

(51) Int. Cl.
*H02G 15/00* (2006.01)

(52) U.S. Cl. .............................. 174/138 G; 174/137 R; 174/135

(58) Field of Classification Search ............ 174/138 G, 174/137 R, 135
See application file for complete search history.

(56) References Cited

U.S. PATENT DOCUMENTS 5,235,337 A * 8/1993 Clark et al. ................... 342/51

OTHER PUBLICATIONS

Bullard, "Bullard T3 Series Thermal Imager", Feb. 1, 2004, internet webpage, p. 11.*
BAE Systems, "BAE Systems, RMS Overview", Jan. 6, 2004,internet webpage, pp. 1-3.*

* cited by examiner

*Primary Examiner*—Jinhee Lee
(74) *Attorney, Agent, or Firm*—David L. Davis

(57) ABSTRACT

A conversion kit for providing a sealed environment for containing a remote monitoring system transmitter and providing electrical connections between the transmitter and an existing environmentally sealed cable harness. The existing cable harness is terminated by a boot adapted to surround a cylindrical structure for environmental sealing contact therewith. The conversion kit includes an adaptor cable harness having terminations at a first end for mating with the terminations of the existing cable harness and terminations at a second end for mating with connectors of the transmitter. The conversion kit also includes an enclosure for containing the transmitter. The enclosure is formed with cylindrical structure at an open end thereof which is surroundable by the boot.

8 Claims, 7 Drawing Sheets

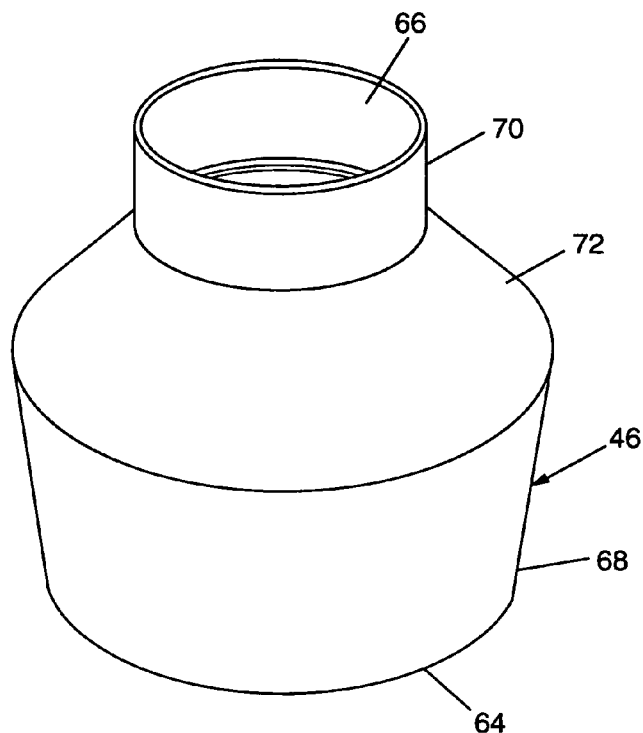
FIG. 5A
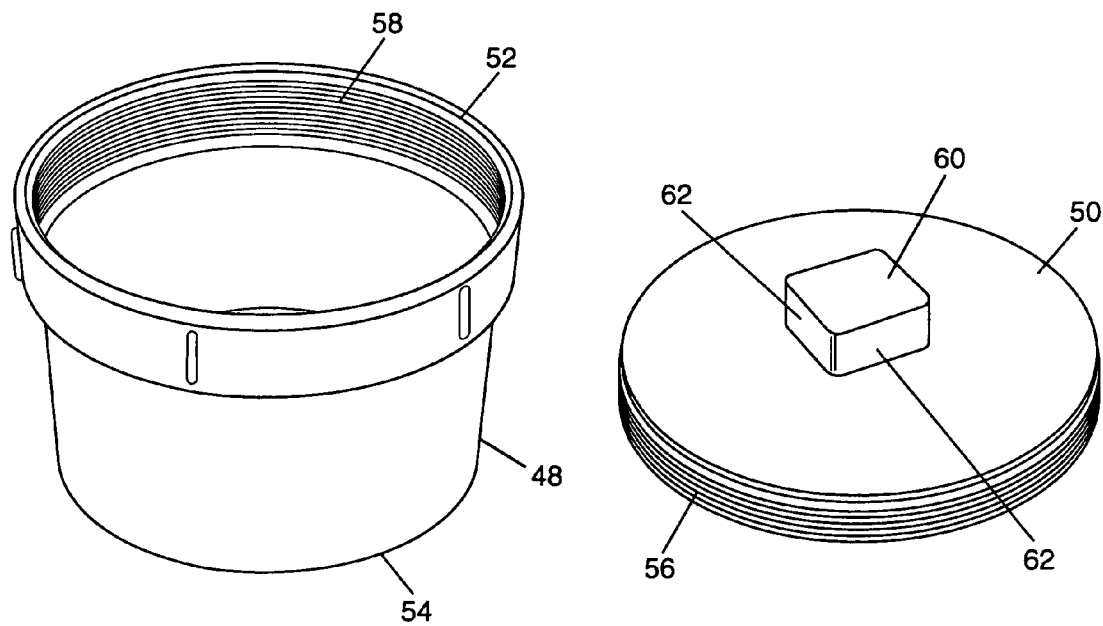
FIG. 5B
FIG. 5C

CONVERSION KIT FOR A REMOTE MONITORING SYSTEM TRANSMITTER

BACKGROUND OF THE INVENTION

This invention relates to a remote monitoring system transmitter for use in an underground utility vault and, more particularly, to a conversion kit whereby the type of transmitter can be changed without changing the existing transmitter cabling, even though the transmitter cable terminations are different.

The need for remote monitoring capability of operating conditions existing at individual transformers in an underground vault of an underground network power distribution system is well known in the art. Ideally, information such as three phase load currents on transformers, status of network protectors, oil temperatures of transformers in excess of specified limits, water levels, fuse status, and surrounding environmental concerns such as vault access, air temperatures, etc., are required so that critical decisions can be made regarding network switching, problem analysis, peak load analysis, contingency studies, etc.

For example, the Remote Monitoring System manufactured by BAE Systems is typical of the current approach to meeting these requirements. This apparatus is a power line carrier system designed specifically to use network distribution feeders as the communications medium between network distribution transformers, located in underground vaults, and the substation. The system consists of a transmitter and sensors installed at the distribution transformer to be monitored and a receiver located at the network substation. The sensors provide input data, such as transformer load currents and network protector position, to the transmitter, which periodically transmits the information, including vault identification, by power line carrier signal over the distribution feeder to the substation receiver. Coupling of the signal to the feeder is accomplished by direct connection to the low voltage side of the network distribution transformer. At the substation, the signal is magnetically detected from the feeder by means of a pick-up coil attached to the feeder cable. Direct electrical connection to the feeder is not required. The substation receiver decodes the signal information and stores the data for presentation on demand. The receiver is microprocessor controlled. In addition to cross referencing data to the actual vault identification, the receiver produces the data in numerous "by exception" formats controlled by command inputs. Network protector status and transformer loading prior to and following feeder outages, are available, thereby reducing the need for feeder patrols. Peak period transformer loading data is instantly available for the whole network simultaneously for more accurate planning than was previously possible with manual measurements, which are not concurrent. Monitoring of spot networks, local areas, and critical locations for maintenance work can be achieved remotely without the need for field crews to be on-site to check status.

Up to now, the above-described transmitter, identified as Model 2391, has been in the form of a sealed cylindrical tube, having connectors on a first end for connection to complementary terminations at a first end of an otherwise environmentally sealed cable harness. The cable harness is connected at its second end to the network distribution transformer in the vault. To protect the transmitter connectors and cable harness terminations from the environment in the vault, which may be wet, the cable harness is equipped with a boot at its first end. After the cable harness terminations are mated to the transmitter connectors, the boot is slipped over the first end of the cylindrical transmitter and environmentally sealed thereto by means of a large hose, or ribbon, clamp.

Due to technological advances and the need for additional monitoring features, the transmitter has been redesigned, and may be identified as Model 2777. With this redesign, the transmitter is no longer in the form of a cylindrical tube, but instead now has a generally rectilinear and boxlike configuration. Additionally, the connectors on the new transmitter are different from the connectors on the old transmitter. Thus, if an old transmitter is to be replaced by a new transmitter, the new transmitter cannot be connected directly to the existing cable harness. It would be desirable to be able to connect the new transmitter to the existing cable harness because this would obviate the need to change internal wiring of the associated transformer, an arduous and time consuming task.

The environment in the underground vault requires that the transmitter and its connections be environmentally sealed. Since the new transmitter design is boxlike instead of cylindrical, the old manner of sealing the transmitter/cable connections is not possible. It would therefore be desirable to be able to provide a sealed environment for the new transmitter design and the transmitter/cable connections.

SUMMARY OF THE INVENTION

According to the present invention, there is provided a conversion kit for providing a sealed environment for containing a remote monitoring system transmitter and providing electrical connections between the transmitter and an existing environmentally sealed cable harness, wherein the existing cable harness is terminated by a boot adapted to surround a cylindrical structure for environmental sealing contact therewith. The conversion kit comprises an adaptor cable harness having at least one termination at a first end for connecting to the existing cable harness and having at least one termination at a second end for connecting to the transmitter. The conversion kit further comprises an enclosure for containing the transmitter, the enclosure having an open end formed as the cylindrical structure surroundable by the boot.

In accordance with an aspect of this invention, the enclosure includes a hollow structure sized to accept the transmitter therein and having first and second open ends, with the second open end of the hollow structure being formed as the cylindrical structure surroundable by the boot. A cover piece is adapted to seal the first open end of the hollow structure.

In accordance with another aspect of this invention, the kit further includes at least one spacer element adapted for insertion between the transmitter and the interior of the hollow structure.

BRIEF DESCRIPTION OF THE DRAWINGS

The foregoing will be more readily apparent upon reading the following description in conjunction with the drawings in which like elements in different figures thereof are identified by the same reference numeral and wherein:

FIGS. 5A, 5B and 5C are perspective views showing exemplary pieces which may be utilized to together form an enclosure for the transmitter, according to the present invention;

DETAILED DESCRIPTION

Figure 1:
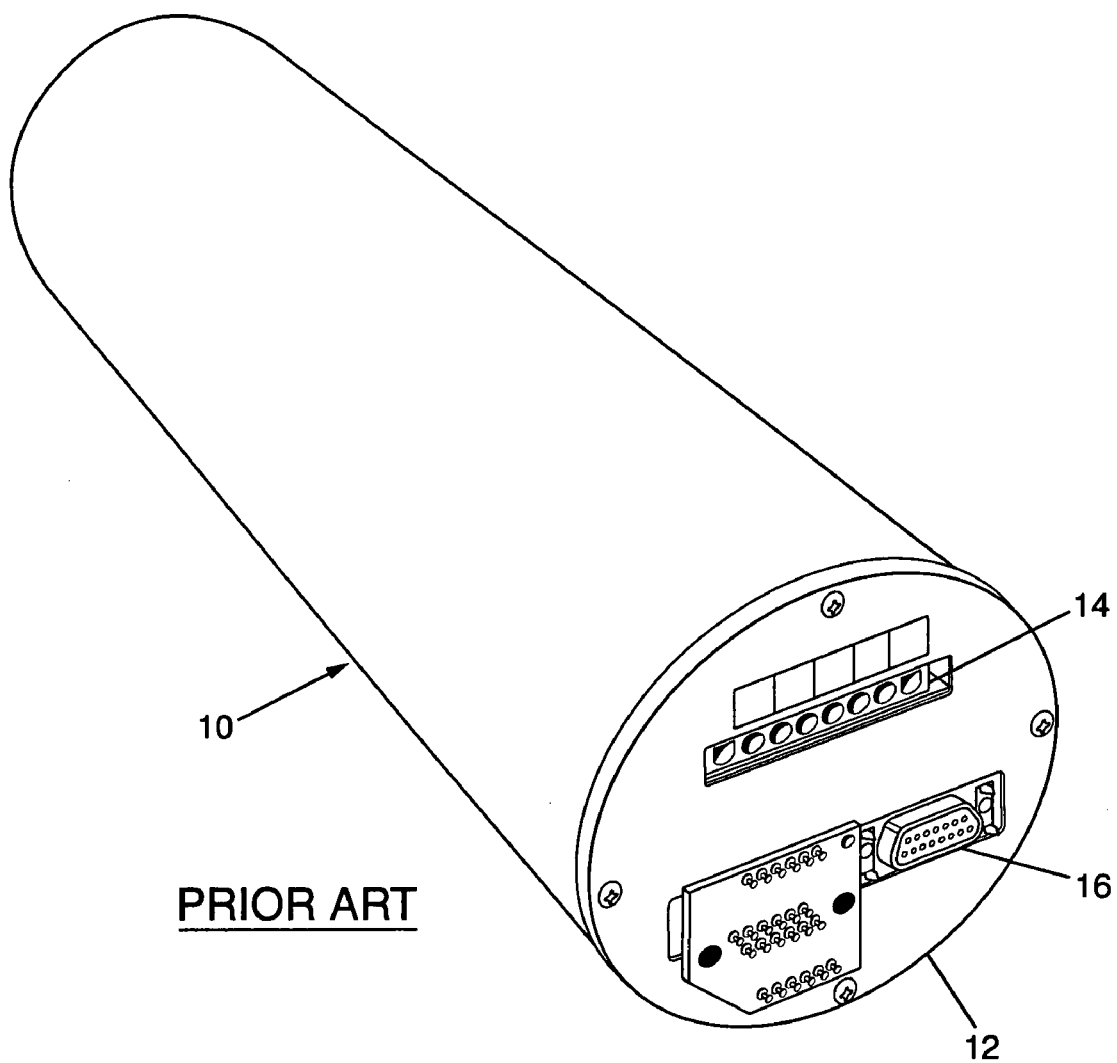
FIG. 1 is a perspective view of the prior art cylindrical tube transmitter, showing the connectors on one end.
Figure 2:
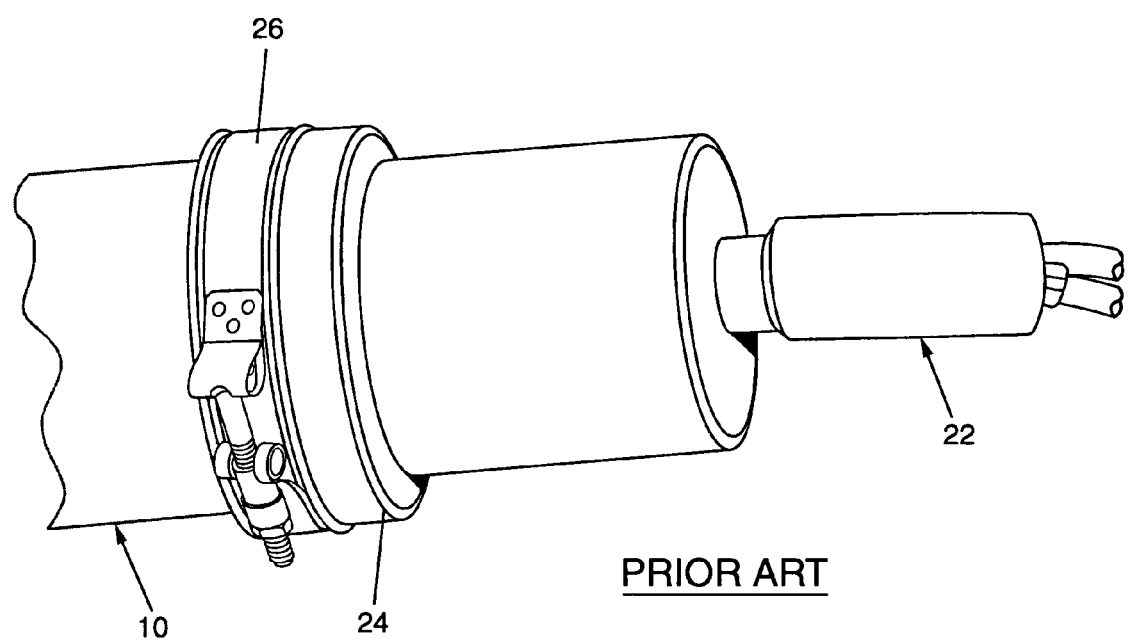
FIG. 2 is a perspective view showing the transmitter of FIG. 1 connected to the environmentally sealed cable harness and having the transmitter/cable connections environmentally sealed by a boot which is part of the cable harness.

Referring to the drawings, FIG. 1 shows the Model 2778 cylindrical tube transmitter, designated generally by the reference numeral 10, which is installable in an underground utility vault of an underground network power distribution system as part of a remote monitoring system. On the end 12 of the transmitter 10 are the connectors 14 and 16, which connect to terminations 18 and 20, respectively, (FIG. 7) at a first end of the cable harness 22 (FIG. 2). The cable harness is sealed against the environment by encasing its wires in an outer protective rubber or plastic covering. The other end (not shown) of the cable harness 22 is connected to the network distribution transformer in the vault and enters the transformer casing through a sealed opening, as is known in the art. The first end of the cable harness 22 is provided with a boot structure 24 surrounding the terminations 18,20 and sealingly connected to the outer protective covering of the cable harness 22. As shown in FIG. 2, the boot 24 is slipped over the end 12 of the transmitter 10 (after the cable terminations 18,20 are connected to the connectors 14,16) and is then securely attached thereto by means of the large hose, or ribbon, clamp 26. This provides a protective sealed environment for the connectors 14,16 and the terminations 18,20.

Figure 3:
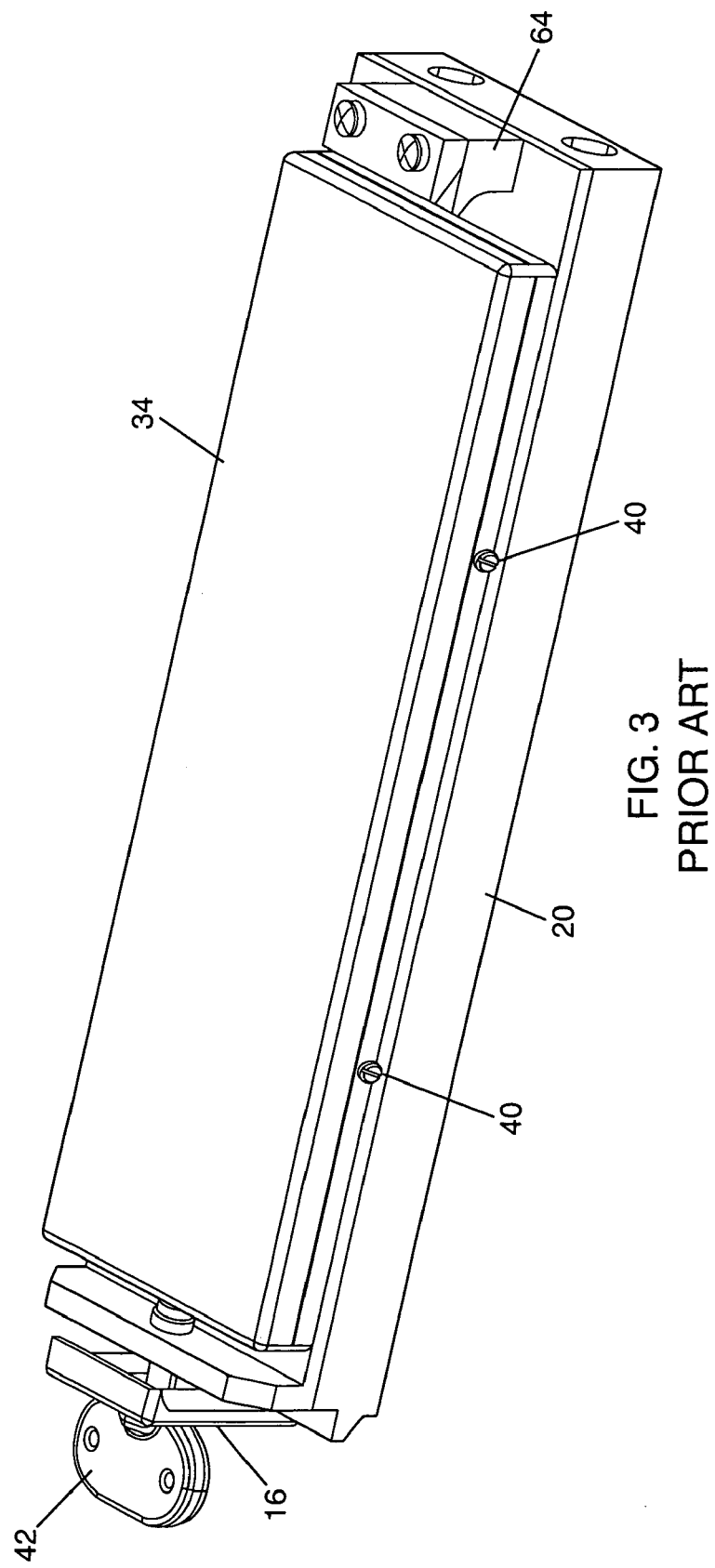
FIG. 3 is a perspective view showing the new transmitter design.

FIG. 3 shows a transmitter, designated generally by the reference numeral 30, which was designed to replace the transmitter 10. Instead of the cylindrical configuration of the original transmitter 10, the replacement transmitter 30 is generally rectilinear, or boxlike. In addition, the connectors 32 and 34 of the replacement transmitter 30 are markedly different from the connectors 14 and 16 of the original transmitter 10. It is therefore apparent that the existing cable harness 22 used with the original transmitter 10 cannot be used with the replacement transmitter 30, either to make electrical connections thereto or to provide a sealed environment for the connectors 32,34. As will be described in full detail hereinafter, according to this invention, there is provided a conversion kit which provides connections between the replacement transmitter 30 and the existing cable harness 22 and also provides a sealed environment for the replacement transmitter 30. Because the existing cable harness 22 is not disturbed when the original transmitter 10 is replaced by the transmitter 30 and the inventive conversion kit is utilized, there is no need to perform any rewiring of the transformer to which the existing cable harness 22 is connected.

Figure 4:
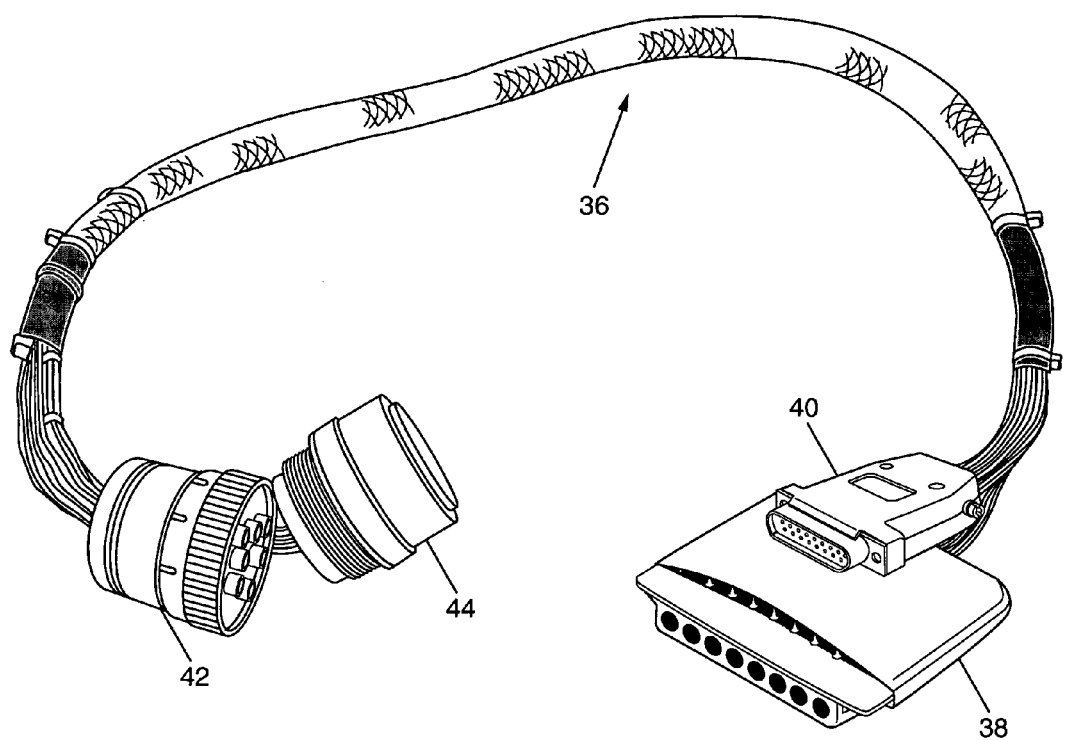
FIG. 4 is a perspective view showing an adaptor cable harness according to the present invention.

FIG. 4 shows an adaptor cable harness 36 which is part of the inventive conversion kit. At a first end of the adaptor cable harness 36 are terminations 38,40 for mating engagement with the terminations 18,20, respectively, of the existing cable harness 22. Thus, the termination 38 emulates the connector 14 of the original transmitter 10 and the termination 40 emulates the connector 16 of the original transmitter 10. At the other end of the cable harness 36 are terminations 42,44 for mating engagement with the connectors 32,34, respectively, of the replacement transmitter 30. As will be described hereinafter, after installation, the adaptor cable harness 36 is within a sealed environment, so there is no need to provide it with its own outer protective covering, in contrast to the existing cable harness 22.

Figure 6:
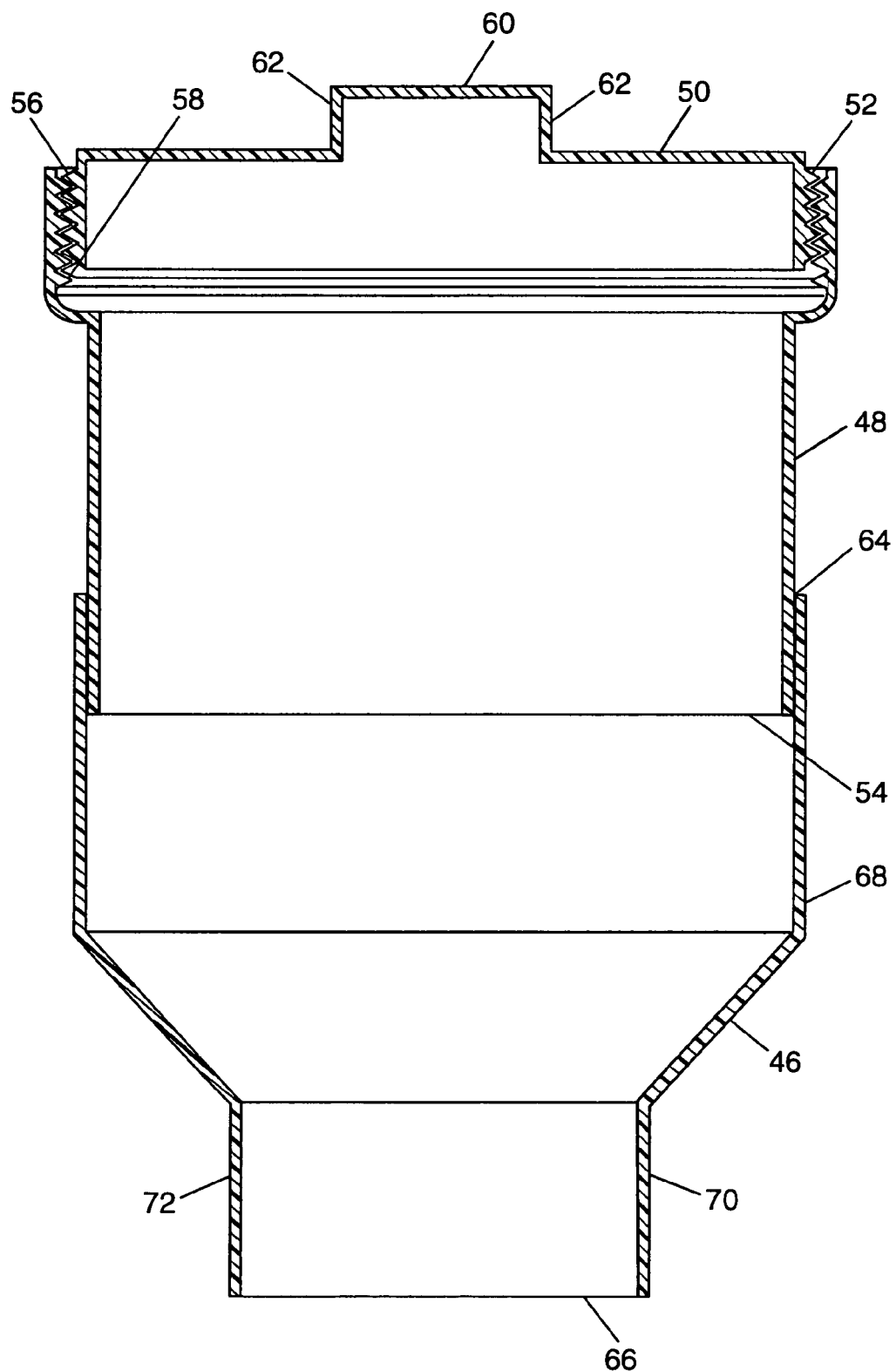
FIG. 6 is a cross-sectional view showing an assembled exemplary enclosure formed from the pieces shown in FIGS. 5A, 5B and 5C.

FIGS. 5A, 5B and 5C show exemplary pieces which may be utilized to together form the enclosure of the inventive conversion kit. Illustratively, those pieces are PVC pipe fittings manufactured by Plastic Trends, Inc. of Shelby Township, Mich. Thus, the piece 46 is a reducer coupling, the piece 48 is a fitting cleanout adaptor and the piece 50 is a threaded plug. The sizes of the pieces 46,48,50 are determined by the size of the transmitter, which fits inside the pieces 46,48,50 when they are assembled to form an enclosure, as shown in FIG. 6. The piece 48 is hollow and is generally cylindrical with first and second open ends 52,54, respectively. Illustratively, the transmitter 30, when viewed from its end 31, is approximately 4⅝ inches wide and 5⅝ inches high, so the exemplary piece 48 is selected as Plastic Trends part number P1508 with an inner diameter of slightly more than nine inches.

The cover piece 50 is a generally planar disc having external peripheral threads 56 for engaging the internal threads 58 at the first open end 52 of the piece 48. The cover piece 50 also has a central boss 60 with a plurality (illustratively four) of flat sides 62 which may be gripped by a wrench, or the like, to turn the cover piece 50 for attachment to the piece 48. Illustratively, the exemplary cover piece 50 is selected as Plastic Trends part number P1158.

The piece 46 is a hollow piece with first and second open ends 64,66, respectively, and is made up of three sections. The first section 68 includes the open end 64 and is generally cylindrical so that it can telescopically surround the open end 54 of the piece 48, as best seen in FIG. 6. The second section 70 includes the open end 66 and is also generally cylindrical. The diameter of the second section 70 is substantially the same as that of the original cylindrical transmitter 10 so that the boot 24 can be placed snugly thereover. The third section 72 is a transitional section between the first and second sections 68,70 and is therefore of frusto-conical shape to account for the diametric difference between the first and second sections 68,70. Illustratively, the exemplary piece 46 is selected as Plastic Trends part number P608-4.

The inventive conversion kit also includes two spacer elements 74,76 (FIG. 7) which are formed of resilient material, such as a urethane foam. The spacer elements 74,76 can be cut from a cylindrical piece of foam so that they each have a planar side which can contact a side of the transmitter 30 and an opposing side which conforms substantially to the interior of the enclosure piece 48. Alternatively, each spacer element 74,76 can be a sheet of foam material which is rolled up and inserted between a respective side of the transmitter 30 and the interior of the enclosure piece 48.

Figure 7:
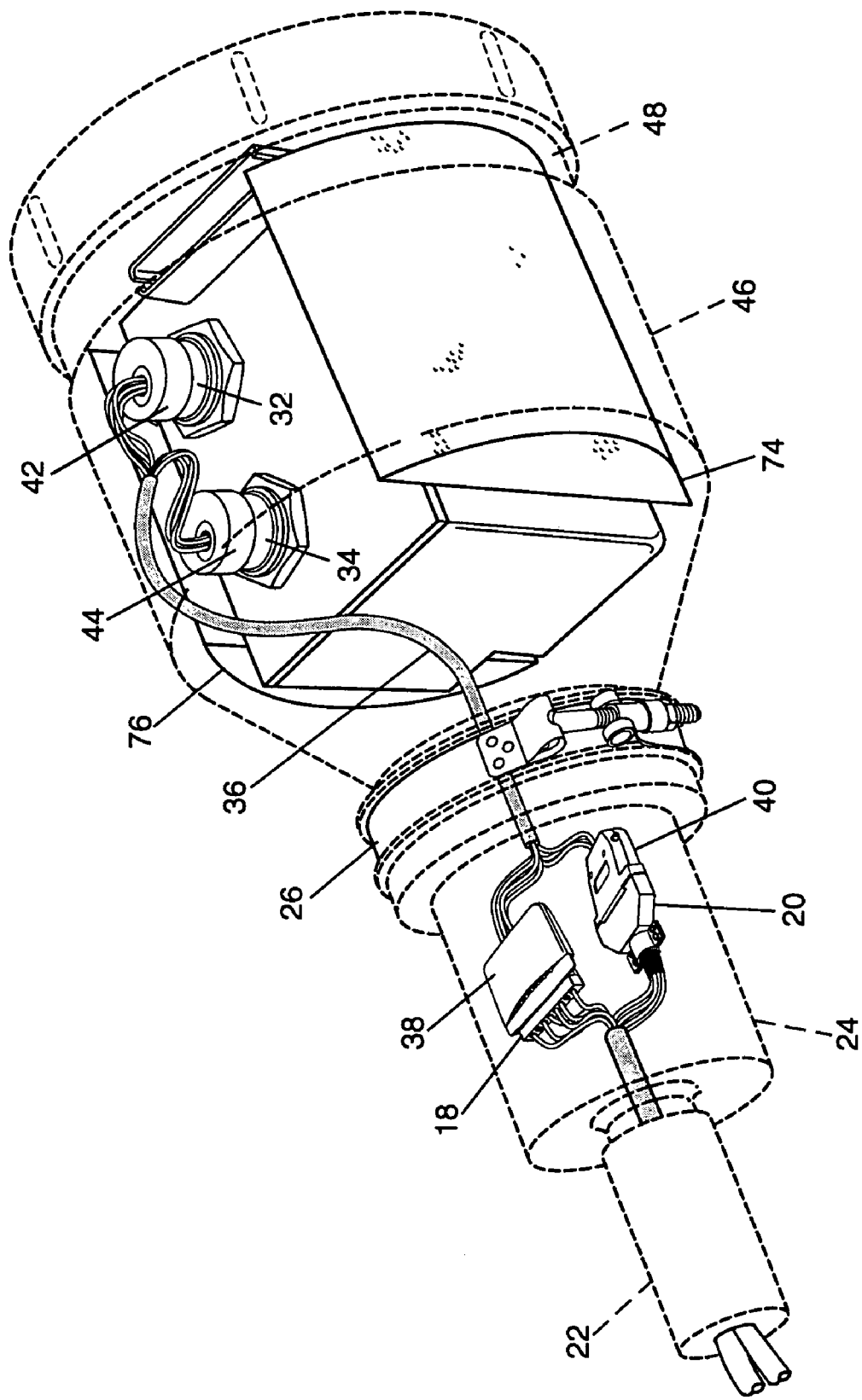
FIG. 7 is a perspective view showing the assembled enclosure with the transmitter, spacer elements and adaptor cable harness contained therein, with the adaptor cable harness connected between the transmitter and the existing cable harness and with the existing cable harness boot sealing the enclosure, according to the present invention, wherein the enclosure and the boot are shown in phantom (broken lines).

To use the inventive conversion kit to replace the original cylindrical transmitter 10 by the box transmitter 30, first the end 64 of the enclosure section 46 is slid over the end 54 of the enclosure section 48 and the two sections are secured to each other by glue. Next, the clamp 26 is loosened, the boot 24 is removed from the end of the transmitter 10 and the cable terminations 18,20 are separated from the connectors 14, 16. The adaptor cable harness 36 is then connected to the box transmitter 30 by mating the cable terminations 42,44 to the transmitter connectors 32,34. The assembly of the adaptor cable harness 36 and the box transmitter 30 is then placed inside the combined enclosure sections 46,48. The spacer elements 74,76 are then inserted each between a respective opposed side of the box transmitter 30 and the interior of the enclosure section 48. The spacer elements 74,76 help protect the box transmitter 30 from vibration and/or shock damage. Next, the free end of the adaptor cable harness 36 is routed through the open end 66 of the reduced diameter section 70 of the enclosure piece 46 and the terminations 38,40 at the free end of the adaptor cable harness 36 are mated to the cable terminations 18,20, respectively, of the existing cable harness 22. The boot 24 is then slid over the reduced diameter section 70 of the enclosure piece 46 and secured thereto by the clamp 26. Anti-seizing compound is applied to the threads 56 of the cover piece 50 and to the threads of the enclosure piece 48, and the cover piece 50 is screwed into the end 52 of the enclosure piece 48. A wrench may be used to grip a pair of opposed flat sides 62 of the boss 60 in order tighten the connection of the cover piece 50 to the enclosure piece 48. FIG. 7 shows the completed assembly.

Accordingly, there has been disclosed a conversion kit whereby a cylindrical transmitter can be replaced by a box transmitter while utilizing an existing cable harness and preserving environmental protection of the cable terminations and the transmitter connectors. While an illustrative embodiment of the present invention has been disclosed, it will be apparent to those of skill in the art that various adaptations and modifications of the described embodiment are possible. It is therefore intended that this invention be limited only by the scope of the appended claims.

What is claimed is:

1. A conversion kit for providing a sealed environment for containing a remote monitoring system transmitter and providing electrical connections between said transmitter and an existing environmentally sealed cable harness, wherein the existing cable harness is terminated by a boot for surrounding a cylindrical structure for environmental sealing contact therewith, the conversion kit comprising:
   an adaptor cable harness having at least one termination at a first end for connecting to said existing cable harness and having at least one termination at a second end for connecting to said transmitter; and
   an enclosure for containing said transmitter, including:
      a first hollow piece sized to accept said transmitter therein and having first and second open ends; and
      a second hollow piece having first and second open ends, said first open end of said second hollow piece being adapted to be telescopically connected to said second open end of said first hollow piece, said second open end of said second hollow piece being formed as said cylindrical structure surroundable by said boot; and
   a cover piece for sealing said first open end of said first hollow piece;
   wherein said second hollow piece is a unitary piece including:
      a first section including said first open end of said second hollow piece which is generally cylindrical for telescopically surrounding said second open end of said first hollow piece;
      a second section including said second open end of said second hollow piece and being formed as said cylindrical structure surroundable by said boot; and
      a third section between said first and second sections and being of frusto-conical shape to account for any diametric difference between said first and second sections of said second hollow piece; and
      the kit further including at least one spacer element for insertion between said transmitter and the interior of said first hollow piece.

2. The kit according to claim 1 wherein said at least one spacer element is formed of a resilient material.

3. The kit according to claim 2 wherein said transmitter has a generally rectilinear exterior and said at least one spacer element has a generally planar side and an opposing side conforming substantially to the interior of said first hollow piece.

4. The kit according to claim 3 wherein there are two of said at least one spacer element each for having its planar side placed against a respective opposite side of said transmitter.

5. The kit according to claim 1 wherein:
   said first hollow piece is generally cylindrical with internal threads at its first open end; and
   said cover piece is a generally planar disc with threads on its periphery which are complementary to the internal threads of said first hollow piece.

6. The kit according to claim 1 further including a supply of glue for sealing said first hollow piece to said second hollow piece.

7. The kit according to claim 5 wherein said cover piece is formed with a central boss having a plurality of flat sides for engagement by a wrench or the like.

8. The kit according to claim 5 further including a supply of anti-seizing compound for application to the threads of said first hollow piece and the threads of said cover piece.

* * * * *